United States Patent
Hanusiak et al.

(10) Patent No.: US 10,360,178 B2
(45) Date of Patent: Jul. 23, 2019

(54) PROCESS SCHEDULING BASED ON FILE SYSTEM CONSISTENCY LEVEL

(71) Applicant: International Business Machines Corporation, Armonk, NY (US)

(72) Inventors: Tomasz Hanusiak, Czarny Dunajec (PL); Konrad W. Komnata, Cracow (PL); Jaroslaw Osinski, Mrozy (PL); Grzegorz P. Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 15/152,599

(22) Filed: May 12, 2016

(65) Prior Publication Data

US 2017/0329789 A1   Nov. 16, 2017

(51) Int. Cl.
*G06F 16/30* (2019.01)
*G06F 16/11* (2019.01)
*G06F 16/14* (2019.01)

(52) U.S. Cl.
CPC .............. *G06F 16/11* (2019.01); *G06F 16/14* (2019.01)

(58) Field of Classification Search
CPC .... G06F 17/3007; G06F 17/301; G06F 16/11; G06F 16/14
See application file for complete search history.

(56) References Cited

U.S. PATENT DOCUMENTS

| 8,214,334 | B2 | 7/2012 | Mikesell et al. | |
| 9,298,919 | B1* | 3/2016 | Demir | H04L 67/20 |
| 2006/0294588 | A1* | 12/2006 | Lahann | H04L 63/1416 726/23 |
| 2007/0275741 | A1* | 11/2007 | Bian | G06F 21/552 455/466 |
| 2009/0037481 | A1 | 2/2009 | Baker | |
| 2011/0061089 | A1* | 3/2011 | O'Sullivan | H04L 63/102 726/1 |
| 2012/0291126 | A1* | 11/2012 | Lagar-Cavilla | G06F 21/56 726/22 |
| 2014/0108469 | A1 | 4/2014 | Majka et al. | |
| 2014/0351936 | A1* | 11/2014 | Hao | G06F 21/561 726/24 |
| 2015/0172140 | A1* | 6/2015 | Habdank | H04L 43/00 709/224 |

* cited by examiner

*Primary Examiner* — Mahesh H Dwivedi
(74) *Attorney, Agent, or Firm* — Gilbert Harmon, Jr.

(57) ABSTRACT

An approach for modifying a scan schedule involving receiving first results of a first file system scan of one or more computer systems, comparing the first results to second results of a previous file system scan of the one or more computer systems, computing a file system change value based on comparing the first results to the second results of the previous file system scan and modifying a frequency of a file system scan schedule based on the file system change value.

20 Claims, 4 Drawing Sheets

PROCESS SCHEDULING BASED ON FILE SYSTEM CONSISTENCY LEVEL

BACKGROUND

The present invention relates generally to the field of software assessment products, and more particularly to scheduled file scans.

Software assessment products are products which can perform scans of file systems on computer systems to determine information about the files contained therein, information such as, but not limited to, a quantification of different file types. One such example of a software assessment product is License Metric Tool by International Business Machines Corporation, a product designed to assist customers of Passport Advantage by International Business Machines Corporation to maintain compliance with the license requirements of the service through a regular file system scans on customer computer systems. File system scans performed by software assessment products can be manually run anytime or they can be configured to automatically run on a predetermined schedule, according to a frequency determined appropriate by a customer, for example.

SUMMARY

According to one embodiment of the present invention, a method for modifying a scan schedule is provided, the method comprising receiving first results of a first file system scan of one or more computer systems; comparing the first results to second results of a previous file system scan of the one or more computer systems; computing a file system change value based on comparing the first results to the second results of the previous file system scan; and modifying a frequency of a file system scan schedule based on the file system change value. A corresponding computer program product and computer system are also disclosed herein.

DETAILED DESCRIPTION

Embodiments of the present invention recognize that software assessment products, which can run on one or more computer systems, do not presently consider the volume of file system changes, associated with the one or more computer systems, in determining a schedule for file system scans. Some computer systems, e.g., production servers, may have stable file systems with very few file changes occurring between scans, while other computer systems, e.g., development and test servers, may undergo more frequent and numerous file changes between scans. It is with this in mind that embodiments of the present invention provide a solution to determine and configure an appropriate schedule for a software assessment product to run a file system scan on one or more computer systems, based on the amount of measurable file system changes, i.e., the rate of file changes, associated with those one or more computer systems between scans.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

Figure 1:
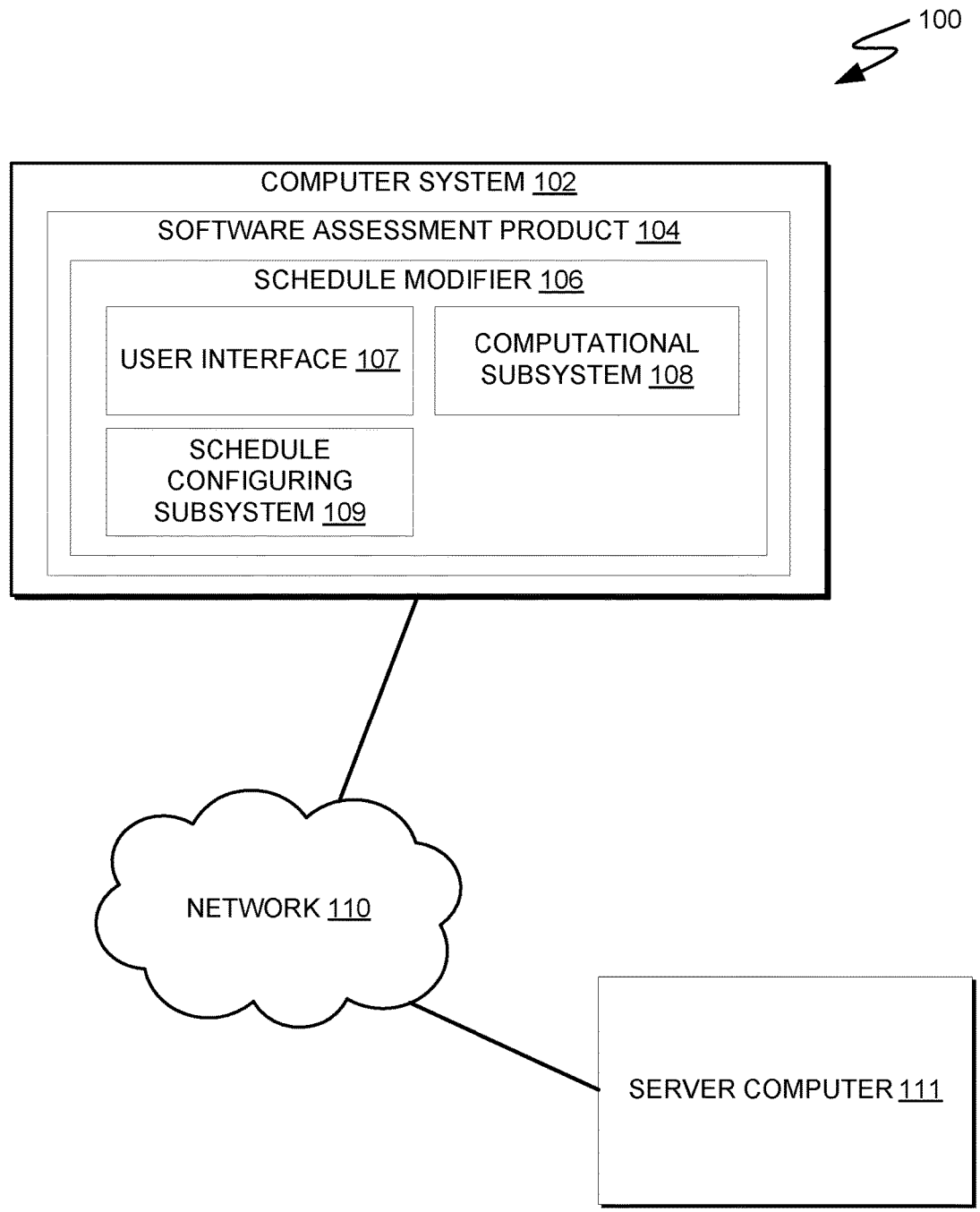
FIG. 1 is a functional block diagram illustrating a distributed data processing environment, in accordance with an embodiment of the present invention.

The present invention will now be described in detail with reference to the figures. FIG. 1 is a functional block diagram illustrating a distributed data processing environment 100, in accordance with one embodiment of the present invention. Distributed data processing environment 100 includes computer system 102 and server computer 111, interconnected over network 110. It should be noted that computer system 102 can generally be representative of any number of computer systems.

Computer system 102 can be a laptop computer, tablet computer, netbook computer, personal computer (PC), a desktop computer, a personal digital assistant (PDA), a smart phone, or any programmable electronic device capable of communicating with server computer 111 via network 110. Computer system 102 comprises software assessment product 104 for determining information about files associated with computer system 102 through manual or scheduled file system scans. Computer system 102 may include internal and external hardware components, as depicted and described in further detail with respect to FIG. 4.

Software assessment product 104 comprises schedule modifier 106, which can dynamically modify a schedule by which a file system scan will automatically run. Schedule modifier 106 further comprises user interface 107, computational subsystem 108 and schedule configuring subsystem 109. By comparing results of a file system scan, e.g., a scan of computer system 102, with previous scans, schedule modifier 106 can algorithmically determine a file system change value used to modify a scan schedule running on software assessment product 104, based on the rate of file changes associated with computer system 102 that has occurred between scans. According to some embodiments of the present invention, computations used for the modification of a scan schedule can involve a plurality of preconfigured and/or dynamic variables, as will be discussed in greater detail subsequently. It should also be noted that according to some embodiments, schedule modifier 106 can be a stand-alone program, downloadable onto computer system 102 and capable of communicating with software assessment product 104.

In various embodiments of the present invention, server computer 111 can be a laptop computer, tablet computer, netbook computer, personal computer (PC), a desktop computer, a personal digital assistant (PDA), a smart phone, or any programmable electronic device capable of communicating with computer systems 102 via network 110. In some embodiments, server computer 111 may be another computer system which receives the results of file system scans performed by software assessment product 104, running on computer system 102.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between computer system 102 and server computer 111.

Figure 2:
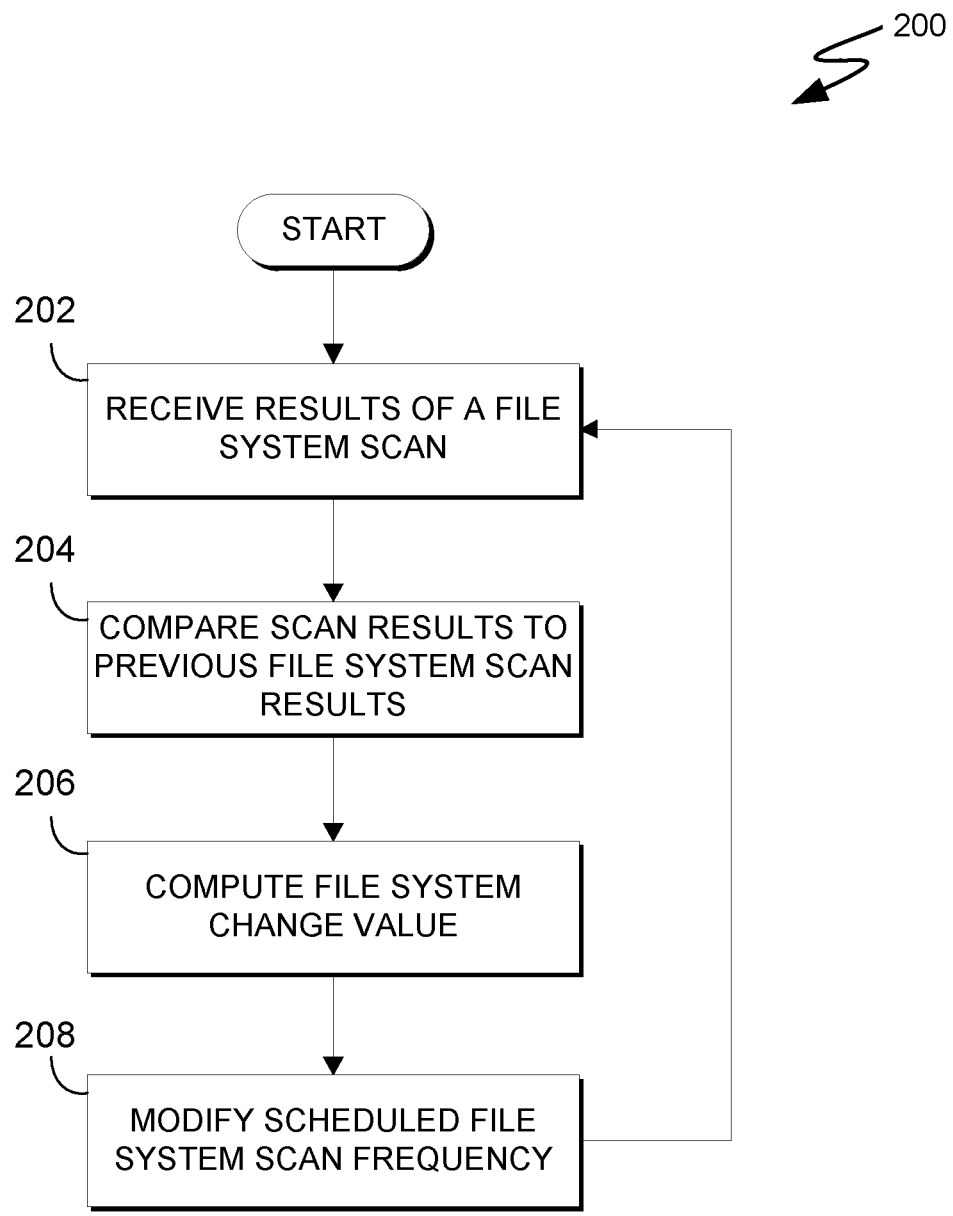
FIG. 2 is a flowchart depicting operational steps of a schedule modifier on a computer system within the data processing environment of FIG. 1, in accordance with an embodiment of the present invention.

FIG. 2 is a flowchart 200 depicting operational steps of schedule modifier 106 for dynamically modifying a file system scan schedule, in accordance with an embodiment of the present invention. Schedule modifier 106 receives, at step 202, the results of a first file system scan of computer system 102, performed by software assessment product 104. The results received may comprise, for example, the number of files detected by the first scan and the numbers of each type of file signature detected. Schedule modifier 106 compares, at step 204, the results received from the first scan with a previous scan, such as the last scan run before the first scan, by accessing the previous scan results through software assessment product 104. The comparison of scan results can be used to determine information such as, but not limited to, the change in the number of files detected between scans and the change in the number of file signatures matched between scans, both of which can be expressed as percentages.

Computational subsystem 108 computes, at step 206, a file system change value, based on a comparison of the results of a most recent scan against the results of a previous scan, e.g., the last scan run before the most recent scan. The frequency with which scheduled file system scans will be performed by software assessment product 104 on computer system 102 is modified, at step 208, by schedule configuring subsystem 109, based on the computed file system change value.

It should be noted that according to some embodiments, schedule modifier 106 can assign an initial predetermined file system consistency level to computer system 102, wherein a file system consistency level is a value used by schedule configuring subsystem 109 to control the frequency of scheduled file system scans performed by software assessment product 104, based on preconfigured criteria. A file system consistency level can be, for example, a value on a scale from 0-100. A computed file system change value may therefore be applied to the file system consistency level of computer system 102 for modifying the frequency of scheduled file system scans performed by software assessment product 104.

It should further be noted that the computation of a file system change value and modification of the frequency of scheduled file system scans can be dependent on a plurality of preconfigured or dynamically adjusted variables, wherein the variables can be entered via user interface 107. Some examples of such variables can comprise, but are not limited to, a maximum allowed change value, a signatures factor, a change threshold, a minimum scan frequency and a maximum scan frequency.

A maximum allowed change value can be a value which limits how much a file system consistency level can change at once. A signatures factor can be a multiplicative factor applied to a change in the number of file signatures matched between scans. A change threshold can be a value which to compare the result of a computation to for determining how a file system consistency level should be changed.

Figure 3:
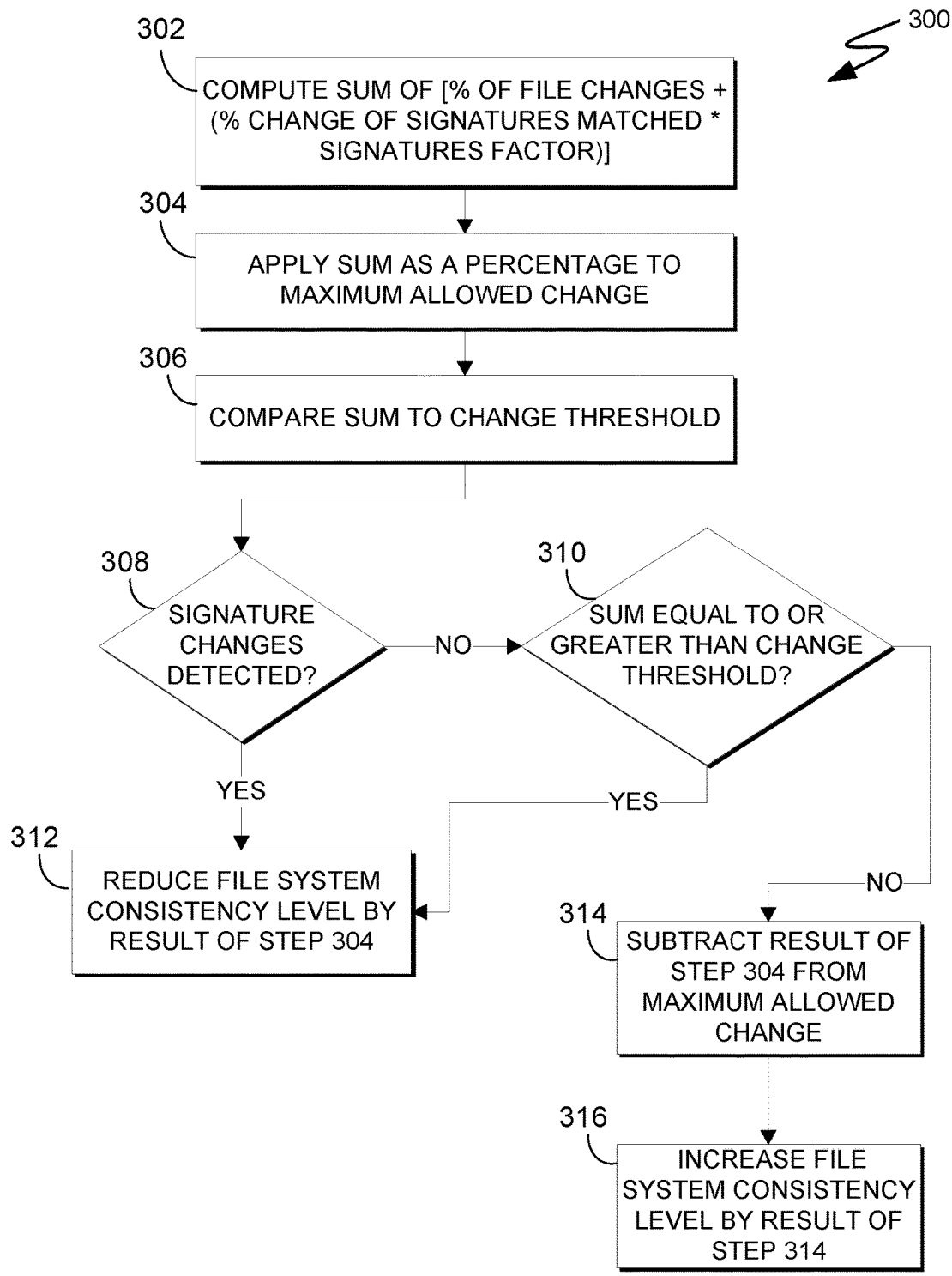
FIG. 3 is a flowchart illustrating computational processes of the schedule modifier, in accordance with an embodiment of the present invention.

FIG. 3 is a flowchart 300 depicting operational steps of computational processes performed by computational subsystem 108 for modifying a file system scan schedule, in accordance with one embodiment of the present invention. Based on received results of a most recent file system scan of computer system 102, computational subsystem 108 computes, at step 302, the following sum:

[% of file changes+(% change of file signatures matched*signature factor)]

Wherein "% of file changes" represents the percentage change in the number of files between file system scans and "% change of file signatures matched" represents the percentage change of file signatures matched between file system scans. The sum computed at step 302 is applied, as a percentage, to the preconfigured maximum allowed change at step 304. For example, if the maximum allowed change is 10 and the sum is 60, embodiments will take 60% of 10 at step 304 for a result of 6.

The sum computed at step 302 is compared, at step 306, to the preconfigured change threshold by computational subsystem 108. If there has been a change in the number of file signatures matched (step 308, YES branch), the file system consistency level of computer system 102 is reduced at step 312 by the result of step 304, i.e., the result of step 304 is a file system change value in this instance for changing the file system consistency level. In the case of the previous example, the file consistency level will be reduced by 6. Alternatively, if there is no change in the number of file signatures matched (step 308, NO branch) but the sum is equal to or greater than the change threshold (step 310, YES branch), the file system consistency level will be reduced as previously described (step 312).

If there has been no change in the number of file signatures matched (step 308, NO branch) and the computed sum is less than the change threshold (step 310, NO branch), the result of step 304 is subtracted from the maximum allowed change at step 314. In the case of the previous example, wherein the result of step 304 is 6 and the maximum allowed change is 10, computational subsystem 108 will accordingly compute [10-6] at step 314 for a result of 4. Computational subsystem 108 increases the file system consistency level, at step 316, by the result of step 314, e.g., 4, which is another example of a file system change value used to change the file system consistency level.

Based on the changes to the file system consistency level of computer system 102 as a result of the computational processes depicted by flowchart 300, schedule configuring subsystem 109 can directly modify the frequency of scheduled system scans performed by software assessment product 104. As an illustrative example, assume that a minimum scan frequency has been set to 1 week, a maximum scan frequency has been set to 25 weeks and computer system 102 has a file system consistency level of 50 on a scale of 0-100, wherein a level of 0 corresponds to the minimum scan frequency and a level of 100 corresponds to the maximum scan frequency. According to this example, a file system consistency level of 50 approximately corresponds to a 12 week scan frequency, being that it is halfway between the minimum and maximum scan frequencies, which have a difference of 24 weeks. Schedule configuring subsystem 109 will accordingly modify the frequency of scheduled file system scans to be 12 weeks, based on the file system consistency level.

Figure 4:
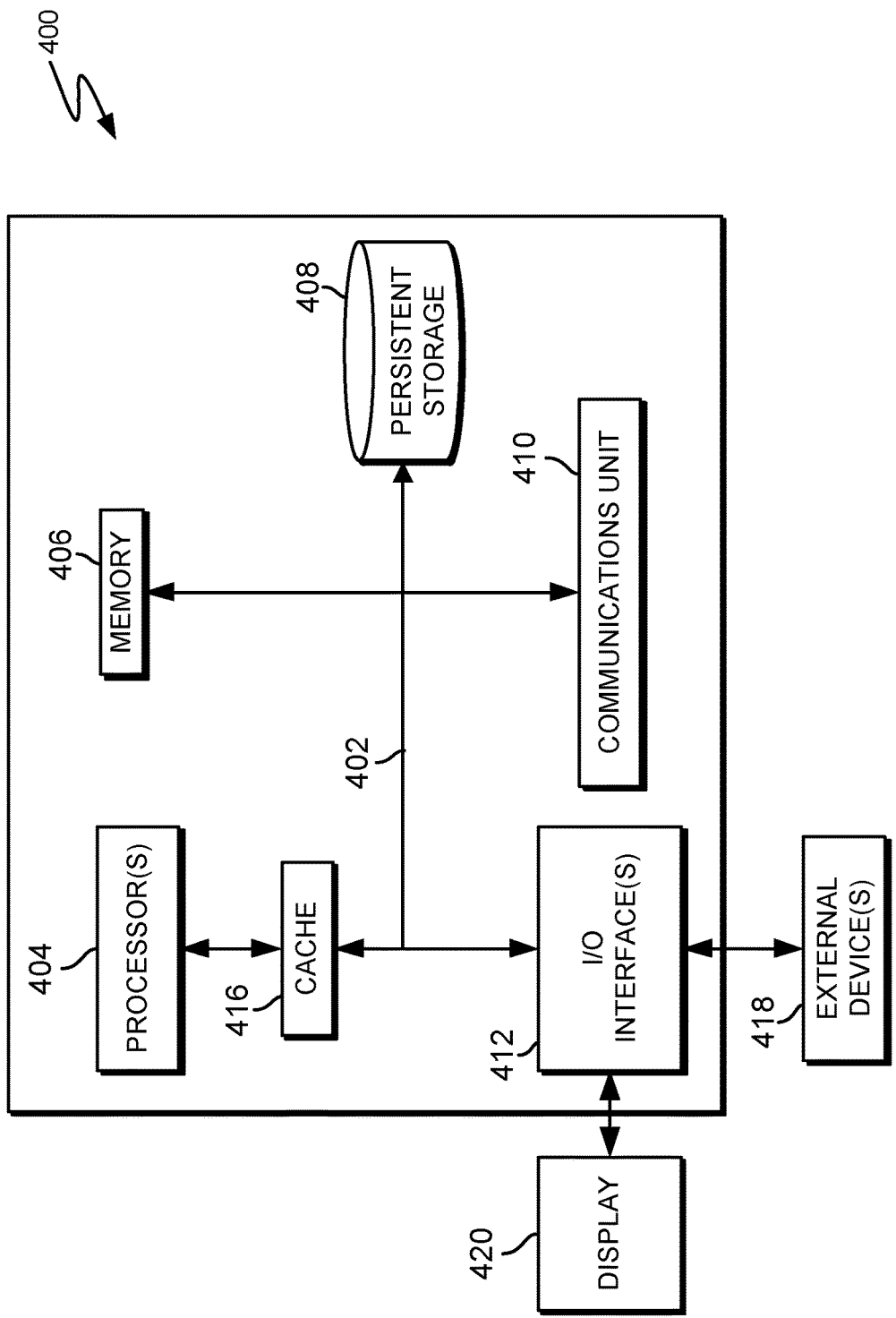
FIG. 4 is a block diagram of components of the computer system executing the intelligent mapping program, in accordance with an embodiment of the present invention.

FIG. 4 depicts a block diagram 400 of components of computer system 102, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 102 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Software assessment product 104 and schedule modifier 106 can be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 can provide communications through the use of either or both physical and wireless communications links. Software assessment product 104 and schedule modifier 106 can be downloaded to persistent storage 408 through communications unit 410.

I/O interface(s) 412 allows for input and output of data with other devices that can be connected to computer system 102. For example, I/O interface 412 can provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., Software assessment product 104 and schedule modifier 106, can be stored on such portable computer readable storage media and can be loaded onto persistent storage 408 via I/O interface(s) 412. I/O interface(s) 412 also connect to a display 420.

Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying a file system scan schedule, the method comprising:
    receiving first results of a first file system scan of one or more computer systems;
    comparing the first results to second results of a previous file system scan of the one or more computer systems;
    computing a file system change (FSC) value based on both comparing the first results to the second results of the previous file system scan and dynamically adjusted variables entered by a user via a user interface based on the equation:

$$FSC = \% \; FC + (\% \; SC * SF)$$

where FSC=file system change value, % FC=the percentage change in the number of files between file system scans, % SC=the percentage change of file signatures matched between file system scans and SF=a predetermined signature factor; and
    modifying a frequency of a file system scan schedule of scans performed by a software assessment product, based on the FSC.

2. The method of claim 1, wherein comparing the first results to the second results comprises determining a change in a number of files detected between the first file system scan and the previous file system scan and determining a change in a number of file signatures matched between the first file system scan and the previous file system scan.

3. The method of claim 1, wherein computing the file system change value is based on a plurality of variables comprising: a maximum allowed change value, a signatures factor, a change threshold, a minimum scan frequency and a maximum scan frequency.

4. The method of claim 1, wherein the one or more computer systems are assigned a file system consistency level, and wherein the frequency is based on the file system consistency level.

5. The method of claim 4, wherein modifying the frequency comprises changing the file system consistency level using the file system change value.

6. The method of claim 5, wherein computing the file system change value comprises computing a sum, based on comparing the first results to the second results, and taking the sum as a percentage of a maximum allowed change value.

7. The method of claim 6, wherein changing the file system consistency level is based on at least one of: comparing the sum to a change threshold and a determination of whether a change in a number of file signatures matched between the first file system scan and the previous file system scan is detected.

8. A computer program product for modifying a file system scan schedule, the computer program product comprising:
one or more computer readable storage media and program instructions stored on the one or more computer readable storage media, the program instructions comprising:
program instructions to receive first results of a first file system scan of one or more computer systems;
program instructions to compare the first results to second results of a previous file system scan of the one or more computer systems;
program instructions to compute a file system change (FSC) value based on both comparing the first results to the second results of the previous file system scan and dynamically adjusted variables entered by a user via a user interface based on the equation:

$$FSC=\% \ FC+(\% \ SC*SF)$$

where FSC=file system change value, % FC=the percentage change in the number of files between file system scans, % SC=the percentage change of file signatures matched between file system scans and SF=a predetermined signature factor; and
program instructions to modify a frequency of a file system scan schedule of scans performed by a software assessment product, based on the FSC.

9. The computer program product of claim 8, wherein the program instructions to compare the first results to the second results comprise determining a change in a number of files detected between the first file system scan and the previous file system scan and determining a change in a number of file signatures matched between the first file system scan and the previous file system scan.

10. The computer program product of claim 8, wherein the program instructions to compute the file system change value are based on a plurality of variables comprising: a maximum allowed change value, a signatures factor, a change threshold, a minimum scan frequency and a maximum scan frequency.

11. The computer program product of claim 8, wherein the one or more computer systems are assigned a file system consistency level, and wherein the frequency is based on the file system consistency level.

12. The computer program product of claim 11, wherein the program instructions to modify the frequency comprise changing the file system consistency level using the file system change value.

13. The computer program product of claim 12, wherein the program instructions to compute the file system change value comprise computing a sum, based on comparing the first results to the second results, and taking the sum as a percentage of a maximum allowed change value.

14. The computer program product of claim 13, wherein changing the file system consistency level is based on at least one of: comparing the sum to a change threshold and a determination of whether a change in a number of file signatures matched between the first file system scan and the previous file system scan is detected.

15. A computer system for modifying a file system scan schedule, the computer system comprising:
one or more computer processors;
one or more computer readable storage media;
program instructions stored on the one or more computer readable storage media for execution by at least one of the one or more processors, the program instructions comprising:
program instructions to receive first results of a first file system scan of one or more computer systems;
program instructions to compare the first results to second results of a previous file system scan of the one or more computer systems;
program instructions to compute a file system change (FCS) value based on both comparing the first results to the second results of the previous file system scan and dynamically adjusted variables entered by a user via a user interface based on the equation:

$$FSC=\% \ FC+(\% \ SC*SF)$$

where FSC=file system change value, % FC=the percentage change in the number of files between file system scans, % SC=the percentage change of file signatures matched between file system scans and SF=a predetermined signature factor; and
program instructions to modify a frequency of a file system scan schedule of scans performed by a software assessment product, based on the file FSC.

16. The computer system of claim 15, wherein the program instructions to compare the first results to the second results comprise determining a change in a number of files detected between the first file system scan and the previous file system scan and determining a change in a number of file signatures matched between the first file system scan and the previous file system scan.

17. The computer system of claim 15, wherein the one or more computer systems are assigned a file system consistency level, and wherein the frequency is based on the file system consistency level.

18. The computer system of claim 17, wherein the program instructions to modify the frequency comprise changing the file system consistency level using the file system change value.

19. The computer system of claim 18, wherein the program instructions to compute the file system change value comprise computing a sum, based on comparing the first results to the second results, and taking the sum as a percentage of a maximum allowed change value.

20. The computer system of claim 19, wherein changing the file system consistency level is based on at least one of: comparing the sum to a change threshold and a determination of whether a change in a number of file signatures matched between the first file system scan and the previous file system scan is detected.

* * * * *